(12) United States Patent
Iyer et al.

(10) Patent No.: US 8,155,058 B2
(45) Date of Patent: Apr. 10, 2012

(54) CLIENT BALANCING IN WIRELESS NETWORKS

(75) Inventors: Pradeep Iyer, Cupertino, CA (US); Sachin Ganu, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 205 days.

(21) Appl. No.: 12/363,611

(22) Filed: Jan. 30, 2009

(65) Prior Publication Data

US 2010/0195497 A1 Aug. 5, 2010

(51) Int. Cl.
*H04W 4/00* (2009.01)
(52) U.S. Cl. .................................. 370/328; 455/422.1
(58) Field of Classification Search .................. 370/328; 455/422.1, 424, 425
See application file for complete search history.

(56) References Cited

U.S. PATENT DOCUMENTS

| | | | |
|---|---|---|---|
| 7,480,264 B1 * | 1/2009 | Duo et al. | 370/310.2 |
| 2005/0265283 A1 * | 12/2005 | Qi et al. | 370/331 |
| 2008/0043637 A1 * | 2/2008 | Rahman | 370/254 |
| 2008/0096575 A1 * | 4/2008 | Aragon et al. | 455/453 |
| 2008/0181184 A1 * | 7/2008 | Kezys | 370/338 |
| 2009/0290489 A1 * | 11/2009 | Wang et al. | 370/230 |

* cited by examiner

*Primary Examiner* — Ricky Ngo
*Assistant Examiner* — Wei-Po Kao
(74) *Attorney, Agent, or Firm* — Blakely, Sokoloff, Taylor & Zafman LLP

(57) ABSTRACT

Client balancing in a wireless digital network comprising a plurality of access nodes connected to a controller. Access nodes collect client density information and periodically report that client density information to the controller. The controller uses the client density information from the access nodes to compute Virtual RF Neighborhoods, identifying Virtual RF neighboring access nodes. Two access nodes are Virtual RF neighbors if a client which can connect to one access node can also connect to the other access node. The controller then identifies which nodes are overloaded by comparing the client loading of a target access node to the client loading of its Virtual RF neighbors. If an access node is identified as overloaded and selected for client balancing on a particular channel, it will initially refuse new association requests from client devices on that channel.

4 Claims, 1 Drawing Sheet

CLIENT BALANCING IN WIRELESS NETWORKS

BACKGROUND OF THE INVENTION

The present invention relates to wireless digital networks, and in particular, to the problem of balancing the client load among access nodes forming a wireless network.

Modern wireless digital networks typically consist of one or more access nodes connected to a controller, and typically provide services to wireless clients according to IEEE 802.11 standards.

Client devices typically select an access node to connect to based on signal strength. With client devices using such simple metrics to select an access node, some access nodes may have more of the client load than others.

What is needed is a way to distribute the client population across access nodes and channels to provide better network performance.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods for distributing clients in a wireless digital network. In an embodiment of the invention, access nodes connected to a controller identify Virtual RF Neighborhoods by collecting and processing data and sending this information to the controller, which correlates the data from the access nodes to form Virtual RF Neighborhoods. The controller identifies if a particular access node is overloaded based on the loads of that access node and the loads of its Virtual RF Neighborhood nodes report to the controller. Clients trying to connect to an overloaded access node are moved to neighboring access nodes by initially rejecting association requests to the overloaded access node.

Figure 1:
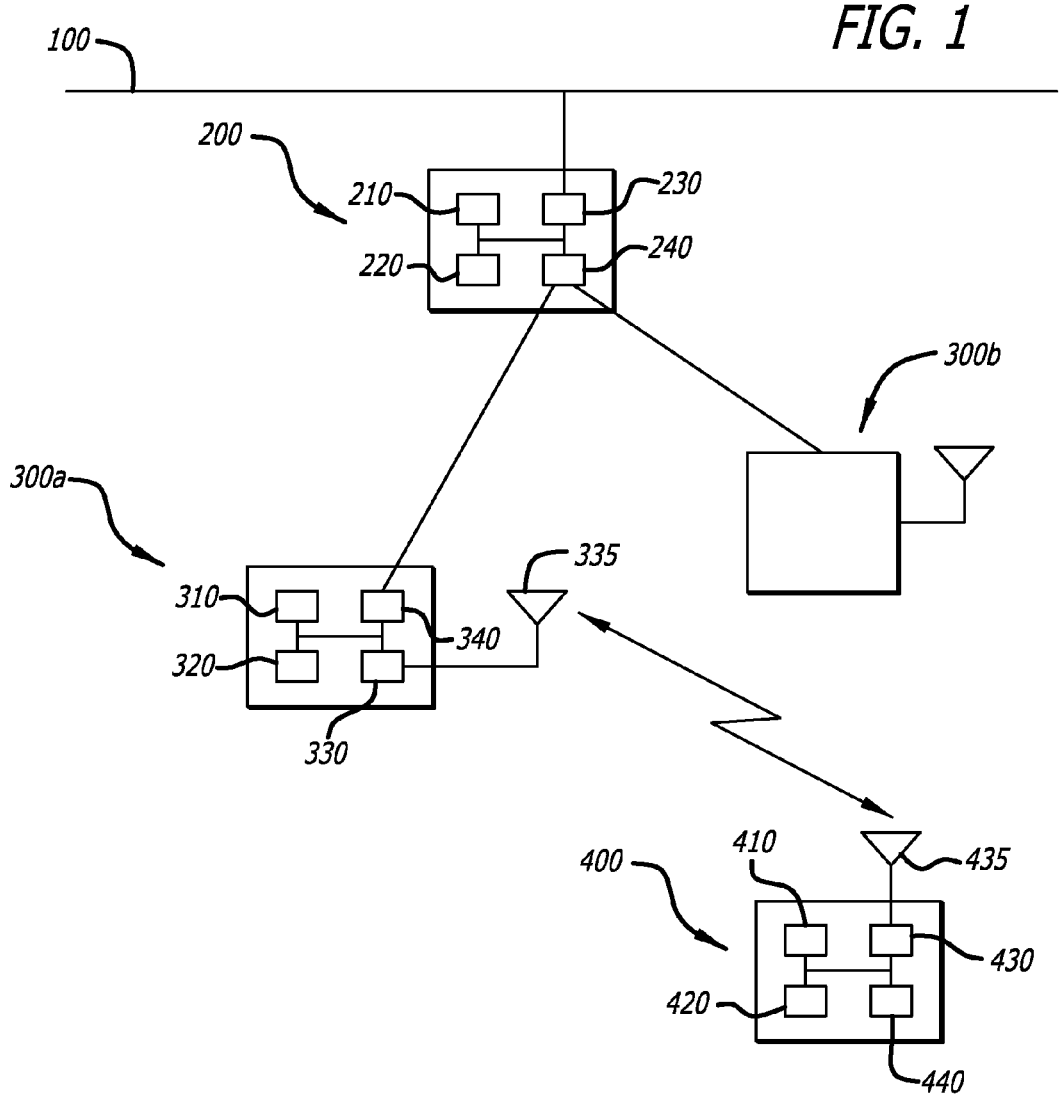
FIG. 1 shows a wireless network.

As shown in FIG. 1, a wireless network operating according to 802.11 standards supports connections of wireless clients 400 to a wired network. Wired network 100, such as a wired IEEE 802.3 Ethernet network, is connected to controller 200. Controller 200 supports connections 250 to access nodes 300*a*, 300*b*. These access nodes provide wireless communications to wireless client 400.

As is understood in the art, controller 200 is a purpose-built digital device having a CPU 210, memory hierarchy 220, and a plurality of network interfaces 230, 240. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interfaces 230, 240 are typically IEEE 802.3 Ethernet interfaces to copper, although high-speed optical fiber interfaces may also be used. Controller 200 typically operates under the control of purpose-built embedded software, typically running under a Linux operating system, or an operating system for embedded devices such as VXWorks.

Similarly, as understood by the art, wireless access nodes 300*a*, 300*b* are also purpose-built digital devices. These access nodes include CPU 310, memory hierarchy 320, wireless interface 330 and wired interface 340. Wired interface 340 may be present but not used for direct communication with controller 200. As with controller 200, the CPU commonly used for such access nodes is a MIPS-class CPU such as one from Raza Microelectronics or Cavium Networks, although processors from other vendors such as Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access node 300 typically operate under control of purpose-built programs running on an embedded operating system such as Linux or VXWorks. Wireless interface 330 is typically an interface operating to the family of IEEE 802.11 standards including but not limited to 802.11a, b, g, and/or n. Wireless interface 330 is connected to antenna 335. At least one antenna is required for each band of operation. Some standards, such as draft 802.11n require multiple antennas per band of operation.

Client wireless device 400 may be a device such as a handheld or laptop computer, a wireless scanner, or other wireless digital device. It too has a CPU 410, memory hierarchy 420, wireless interface 430 with antenna 435, and additional I/O devices 440, which may include scanners, displays, keyboards, touch screens, and the like. A wider variety of CPUs may be used in such client devices, ranging from relatively low-power CPUS such as those from Acorn or Texas Instruments, to the higher-performance CPUs used in modern laptop computers from companies such as Intel and AMD. Wireless interface 430 typically operates to one or more IEEE 802.11 standards. In operation, to make use of network services, such as services available through wired network 100, a client device 400 must first associate with an access node 300, served by controller 200. Client device sends an association request to an access node, such as access node 300*a*.

Figure 2:
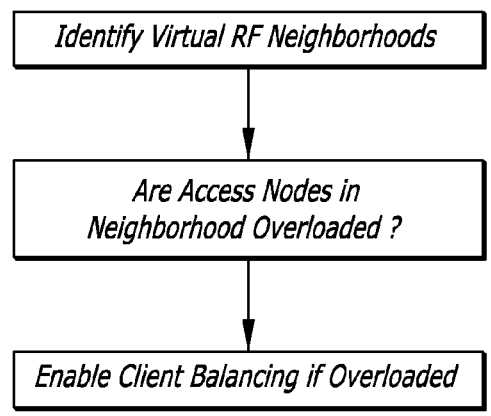
FIG. 2 shows a flowchart of client balancing.

According to an aspect of the invention, the process of client balancing over a group of access nodes comprises a sequence of steps as shown in FIG. 2. In the first step, Virtual RF Neighborhoods for access nodes are identified. Second, using the Virtual RF Neighborhood information, access nodes are examined to see if they are overloaded based on their load in comparison to the loads of their Virtual RF Neighborhood access nodes. Third, if an access node is identified as overloaded, clients trying to connect to the overloaded access node are moved to neighboring access nodes in the Virtual RF Neighborhood.

According to an aspect of the invention, access node AN2 is a virtual RF neighbor of access node AN1 if clients that can connect to AN1 can also connect to AN2. In one embodiment, this is computed by having each access node 300 advertise its client density to controller 200. Client density at an access node 300 is computed by tracking unique probe requests received by the access node from client devices over a predetermined period. One method of keeping such a client density is to track received signal levels hashed by a client identifier. One embodiment of this computation takes the four byte client MAC address contained in the probe request and computes a seven bit hash value; a seven bit hash value produces a Client Density array of 128 elements which is stored in memory hierarchy 320. A simple hash may be performed as the XOR of the four bytes of the client MAC address modulo 128. Other hash functions may also be used. Client density may be computed as a weighted RSSI of probe requests from client devices having that hash value. As an example, if H is the hash value used as an index into the Client Density array CD, CD[H]=CD[H]+Client_RSSI/15. This Client Density array is sent by the access node to the controller periodically, as an example, every 30 seconds. The sampling period and the length of the hash table may be adjusted to trade off table size with collision probability; the shorter the table, the higher the probability of a hash collision between client devices with different MAC addresses, while longer tables require more storage in memory hierarchy 320, and more time to transmit to the controller.

In controller 200, the RF Neighborhood of an access node is maintained by keeping track of access nodes which hear beacons from neighboring access nodes. The Virtual RF Neighborhood is a subset of the access node RF neighborhood, and is computed using the Client Density arrays received from the connected access nodes 300 and stored in memory hierarchy 320.

In one embodiment, Virtual RF Neighborhoods are computed by controller 200 by computing client density overlap between pairs of access nodes using the Client Density arrays provided periodically to the controller by each access node. It should be noted that while this computation is performed on pairs of access nodes, an access node may have more than one Virtual RF neighbor.

Assume the Client Density array for access node 300a is CDA1, and the Client Density array for access node 300b is CDA2. Assume also that CDA1 and CDA2 were collected during similar intervals. Since both access nodes use the same hashing function for collecting signal density, a client device seen by one access node should also be seen by the other access node if they are indeed neighbors. This would be represented by nonzero values in the same positions in arrays CDA1 and CDA2. If access node 300a and access node 300b are virtual RF neighbors, then a high proportion of client devices heard by access node 300a, as represented by nonzero values in CDA1, should have also been heard by access node 300b, as represented by nonzero values in CDA2, and vice versa, with a high proportion of client devices heard by access node 300b also heard by access node 300a.

One approach to performing this computation is to compute the percentage of nonzero entries in CDA1 which also have nonzero entries in CDA2; the number of nonzero slots in CDA1 which also have nonzero slots in CDA2 divided by the total number of nonzero slots in CDA1. Also compute the similar value, the percentage of nonzero entries in CDA2 which also have nonzero entries in CDA1. When both of these percentages exceed a threshold value, for example 50%, then access node 300b is considered to be a virtual RF neighbor of access node 300a.

The second step of the process is to identify whether an access node is overloaded in comparison to other access nodes in its Virtual RF neighborhood. This may be done at the controller by computing the channel load on a target access node as the number of clients on each channel for the target access node, and for Virtual RF neighbors of the target access node. Other figures of merit may also be used, such as the summed cross-product of clients and client traffic per channel. If the difference in access node loading on a particular channel is greater than a predetermined threshold amount, for example, 20%, then that channel and group of access nodes within a Virtual RF neighborhood may be subject to client balancing.

In one embodiment, the controller computes a load metric for each access node by channel. An access node may support operations on multiple channels. In one embodiment, this load metric may be simply the number of clients on the channel for the target access node, which is tracked by the controller. Given the target access node and examining the virtual RF neighbors of the target node as previously calculated, if all the virtual RF neighbors have client balancing enabled, then client balancing on the target access node is disabled. If the load metric, such as the number of clients in one channel (other than the target access node's channel) is a predetermined percentage, 20% for example, less than the number of clients in the target access node channel, then client balancing is disabled in the target access node.

When client balancing is disabled in an access node, association requests from clients are always accepted.

In the third step of the process, according to one embodiment of the invention, if client balancing is enabled for a target access node, Association Requests from new clients to the target node are handled in the following manner:

If the client device has been rejected two or more times from another access node connected to the same controller 200, accept the client association request.

If the client device has been rejected by the target access node and attempts to associate again with the target access node, accept the client association request.

If this is the first time the client device is trying to connect to the target access node, reject the request. Optionally, send a response code in the Association Response indicating that the access node is resource constrained.

In this manner, when client balancing is enabled, new association requests will be initially rejected by an access node having client balancing enabled, and the client device will most likely attempt to associate with an access node in the same Virtual RF neighborhood. If, however, the client device continues to send association requests to the same access node, even if it has client balancing enabled, eventually an association request will be accepted.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method of client balancing in a wireless digital network comprising a plurality of access nodes connected to a controller, the method comprising:

identifying a Virtual RF neighborhood for each of the plurality of access nodes connected to the controller, the Virtual RF neighborhood of one access node being a subset of a RF neighborhood of the one access node, the RF neighborhood of the one access node including one or more access nodes that hear beacons from the one access node;

using the Virtual RF Neighborhood information for a target access node to determine if the target access node is overloaded; and enabling client load balancing on the target access node if the target access node is overloaded, the target access node being overloaded if a load on the target access node exceeds a load in the Virtual RF neighborhood by a first predetermined threshold, whereby the target access node initially rejects new association requests from a wireless client;

wherein the step of identifying the Virtual RF neighborhood comprises the steps of:

collecting for a predetermined period of time client density data in each of the plurality of access nodes connected to the controller, sending the client density data from the each of the plurality of access nodes to the controller on a periodic basis, and computing at the controller the Virtual RF neighborhoods for each of the plurality of the access nodes by: selecting the client density data for pairs of access nodes, and testing the pairs of client density data to see if the client density overlap between the pairs of client density data exceeds a second predetermined threshold, and identifying the pair of access nodes as Virtual RF neighbors if the second threshold is exceeded.

2. The method of claim 1 where the step of determining if an access node is overloaded comprises:

selecting, at the controller, an access node as the target node, computing at the controller a loading figure for the target node and those nodes which are Virtual RF neighbors of the target node, and enabling or disabling client load balancing on the target node based on the load figure of the target node in comparison to the load figures of other access nodes in the target node's Virtual RF neighborhood.

3. The method of claim 1 where the step of initially rejecting new association requests from a wireless client by the target node further comprises:

if the wireless client has been rejected two or more times by an access node connected to the controller, accept the client association request at the target node, if the client has been rejected once by the target node and sends a further association request to the target node, accept the client association request to the target node, and if the association request is the first one to the target node, reject the request.

4. The method of claim 3 where the step of rejecting the request further comprises signaling a "resource constrained" code in the rejection.

* * * * *